United States Patent
Saito et al.

(10) Patent No.: US 11,135,615 B2
(45) Date of Patent: Oct. 5, 2021

(54) PROCESS FOR PRODUCING COATED ARTICLE

(71) Applicant: AGC INC., Chiyoda-ku (JP)

(72) Inventors: Shun Saito, Chiyoda-ku (JP); Mizuna Toyoda, Chiyoda-ku (JP); Masataka Aikawa, Chiyoda-ku (JP)

(73) Assignee: AGC INC., Chiyoda-ku (JP)

( * ) Notice: Subject to any disclaimer, the term of this patent is extended or adjusted under 35 U.S.C. 154(b) by 0 days.

(21) Appl. No.: 16/254,641

(22) Filed: Jan. 23, 2019

(65) Prior Publication Data

US 2019/0193112 A1    Jun. 27, 2019

Related U.S. Application Data

(63) Continuation of application No. PCT/JP2017/026981, filed on Jul. 26, 2017.

(30) Foreign Application Priority Data

Jul. 26, 2016    (JP) .............................. JP2016-146449

(51) Int. Cl.

| | |
|---|---|
| B05D 1/36 | (2006.01) |
| B05D 7/24 | (2006.01) |
| C09D 5/03 | (2006.01) |
| B05D 1/06 | (2006.01) |
| B05D 7/00 | (2006.01) |
| C09D 5/00 | (2006.01) |
| C09D 127/12 | (2006.01) |
| C09D 175/04 | (2006.01) |
| B05D 3/10 | (2006.01) |
| C09D 127/16 | (2006.01) |
| C09D 167/00 | (2006.01) |

(52) U.S. Cl.
CPC ................. *B05D 1/36* (2013.01); *B05D 1/06* (2013.01); *B05D 3/10* (2013.01); *B05D 7/24* (2013.01); *B05D 7/542* (2013.01); *C09D 5/002* (2013.01); *C09D 5/03* (2013.01); *C09D 5/035* (2013.01); *C09D 5/036* (2013.01); *C09D 127/12* (2013.01); *C09D 127/16* (2013.01); *C09D 167/00* (2013.01); *C09D 175/04* (2013.01)

(58) Field of Classification Search
CPC ..................................... B05D 1/06; B05D 1/36
See application file for complete search history.

(56) References Cited

U.S. PATENT DOCUMENTS

| | | | | | |
|---|---|---|---|---|---|
| 3,711,449 | A | * | 1/1973 | Brendley, Jr. ........... | C08F 28/00 526/287 |
| 3,989,766 | A | * | 11/1976 | Nishizaki ............. | C08G 59/226 525/524 |
| 5,962,546 | A | * | 10/1999 | Everaerts ............. | C07D 303/34 522/25 |
| 2002/0114953 | A1 | * | 8/2002 | Itou ...................... | C09D 167/00 428/413 |
| 2006/0014031 | A1 | | 1/2006 | Ohkoshi et al. | |
| 2012/0199250 | A1 | * | 8/2012 | Zoboli .................... | C23C 22/34 148/244 |
| 2015/0072151 | A1 | * | 3/2015 | Saito ....................... | C09D 7/48 428/421 |
| 2016/0362559 | A1 | | 12/2016 | Saito et al. | |

FOREIGN PATENT DOCUMENTS

| | | | |
|---|---|---|---|
| JP | 11-156292 | | 6/1999 |
| JP | 11-300271 | | 11/1999 |
| JP | 11300271 | A  * | 11/1999 |
| JP | 2003-211083 | | 7/2003 |
| JP | 2003211083 | A  * | 7/2003 |
| JP | 3992337 | | 10/2007 |
| WO | WO 2004/044065 A1 | | 5/2004 |
| WO | WO 2012/023216 A1 | | 2/2012 |
| WO | WO 2012/048650 A1 | | 4/2012 |
| WO | WO 2016/002724 A1 | | 1/2016 |

OTHER PUBLICATIONS

JPH11300271, machine translation. (Year: 1999).*
JP2003211083, machine translation. (Year: 2003).*
International Search Report dated Sep. 5, 2017 in PCT/JP2017/026981 filed on Jul. 26, 2017 (with English Translation).

* cited by examiner

*Primary Examiner* — Robert A Vetere

(74) *Attorney, Agent, or Firm* — Oblon, McClelland, Maier & Neustadt, L.L.P.

(57) ABSTRACT

To provide a process for producing a coated article, capable of producing a coated article having a coating film excellent in weather resistance, using a powder coating material.

A process for producing a coated article having a substrate, comprising:
applying a curable powder coating material containing a curable polymer containing no fluorine atom, a curing agent and a pigment to a surface of a substrate, to form a first coating layer composed of the curable powder coating material, then
applying a powder coating material containing a fluorinated polymer and containing no pigment to a surface of the first coating layer, to form a second coating layer composed of the powder coating material, and
heating the first coating layer and the second coating layer simultaneously to form a coating film on the surface of the substrate.

17 Claims, No Drawings

PROCESS FOR PRODUCING COATED ARTICLE

TECHNICAL FIELD

The present invention relates to a process for producing a coated article excellent in weather resistance, using a powder coating material.

BACKGROUND ART

A coating film containing a fluorinated polymer is excellent in weather resistance and is used in a field in which maintenance free requirements should be fulfilled. On the other hand, in recent years, global scale environmental destruction problems such as global warming, ozone layer depletion, acid rain, etc. have gained prominent attention, and various regulations have been established from the viewpoint of environmental protection. Particularly, release into the atmosphere of organic solvents (particularly VOC) has been a serious problem, and the movement for de-organic solvents (particularly de-VOC) has become active.

Also in the paint industry, as a substitute for conventional organic solvent-based coating material, a powder coating material containing a fluorinated polymer is highly expected as a coating material which contains no VOC and which has low environment burden as it can be recovered and reused without requiring exhaust treatment or waste water treatment.

As such a powder coating material, Patent Document 1 discloses a powder coating material containing a fluorinated polymer, a polyester resin and a pigment. When a coating film is formed by applying the powder coating material to a substrate, the polyester resin is likely to be located on the substrate side (lower layer portion) of the obtained coating film, and the fluorinated polymer is likely to be located on the air side (upper layer portion). That is, by using such a powder coating material, a two-layer structure coating film can be formed by one application (so-called one coat one bake method).

PRIOR ART DOCUMENTS

Patent Documents

Patent Document 1: WO2012/048650

DISCLOSURE OF INVENTION

Technical Problem

However, more improvement in weather resistance of a coating film in a coated article comprising a substrate and a coating film disposed on the surface of the substrate has been required.

The present inventors have prepared a coated article using the powder coating material disclosed in Patent Document 1 and studied the weather resistance of a coating film of the coated article and as a result, found that further improvement in weather resistance is necessary. Particularly, they have found that the weather resistance of the coating film at the edge portion of the coated article should be improved.

Under these circumstances, it is an object of the present invention to provide a process for producing a coated article having a coating film excellent in weather resistance, using a powder coating material.

Solution to Problem

The present inventors have conducted extensive studied to achieve the above object and as a result, found that the above object can be achieved by the following process and accomplished the present invention.

The present invention has the following constructions.

(1) A process for producing a coated article having a substrate, comprising:
applying a curable powder coating material containing a curable polymer containing no fluorine atom, a curing agent and a pigment to a surface of a substrate, to form a first coating layer composed of the curable powder coating material, then
applying a fluorinated powder coating material containing a fluorinated polymer and containing no pigment to a surface of the first coating layer, to form a second coating layer composed of the fluorinated powder coating material, and
heating the first coating layer and the second coating layer simultaneously to form a coating film on the surface of the substrate.

(2) The production process according to (1), wherein the fluorinated powder coating material further contains at least one organic ultraviolet absorber selected from the group consisting of a salicylic acid ester type, a benzotriazole type, a hydroxyphenyltriazine type, a benzophenone type and a cyanoacrylate type, or an inorganic ultraviolet absorber.

(3) The production process according to (1) or (2), wherein the fluorinated powder coating material further contains at least one resin selected from the group consisting of a (meth)acrylic resin, a polyester resin and an epoxy resin.

(4) The production process according to any one of (1) to (3), wherein the fluorinated polymer is a curable fluorinated polymer, and the fluorinated powder coating material further contains a curing agent.

(5) The production process according to any one of (1) to (3), wherein the fluorinated polymer is PVDF.

(6) The production process according to (4), wherein the curable fluorinated polymer is a curable fluorinated polymer having at least one type of functional group selected from the group consisting of a hydroxy group and a carboxy group, and the curing agent contained in the fluorinated powder coating material has at least two groups per molecule of at least one type reactive with the functional group, selected from the group consisting of an isocyanate group, a blocked isocyanate group, an alkoxysilyl group, a carbodiimide group, an oxazoline group, an epoxy group, an alkylated methylol group, a hydrazide group and a β-hydroxyalkylamide group.

(7) The production process according to any one of (1) to (6), wherein the curable polymer containing no fluorine atom is at least one non-fluorinated resin selected from the group consisting of a polyester resin, a (meth)acrylic resin and an epoxy resin.

(8) The production process according to any one of (1) to (7), wherein the melt viscosity of the curable polymer containing no fluorine atom at 190° C. is at least 0.1 Pa·s.

(9) The production process according to any one of (1) to (8), wherein the melt viscosity of the fluorinated polymer at 190° C. is higher than the melt viscosity of the curable polymer containing no fluorine atom at 190° C. and is at most 10 Pa·s.

(10) The production process according to any one of (1) to (9), wherein the absolute value of the difference between the angle of repose of the curable powder coating material and the angle of repose of the fluorinated powder coating material is within 20°.

(11) The production process according to any one of (1) to (10), wherein the first coating layer and the second coating layer are heated simultaneously to a temperature of at most 200° C.

(12) The production process according to any one of (1) to (11), wherein the first coating layer composed of the curable powder coating material is formed by applying the curable powder coating material to the surface of the substrate by electrostatic coating, the second coating layer composed of the fluorinated powder coating material is formed by applying the fluorinated powder coating material to the surface of the first coating layer by electrostatic coating, and the applied voltage (V2) at the time of electrostatic coating of the fluorinated powder coating material to the applied voltage (V1) at the time of electrostatic coating of the curable powder coating material is within a range of the applied voltage (V1)±100 kV.

(13) The production process according to any one of (1) to (12), wherein the substrate is a substrate formed from aluminum or an aluminum alloy surface-treated with a chemical conversion treatment agent.

(14) The production process according to (13), wherein the chemical conversion treatment agent is a zirconium-type chemical conversion treatment agent or a titanium-type chemical conversion treatment agent.

(15) The production process according to any one of (1) to (14), wherein the coated article is a building exterior member.

Advatageous Effects of Invention

According to the present invention, a process for producing a coated article using a powder coating material, the coated article having a coating film consisting of two separate coating films of a first coating film formed of a first coating layer and a second coating film formed of a second coating layer, the coating film being excellent in weather resistance and also excellent in alkali resistance, processability, impact resistance and surface smoothness, is provided.

DESCRIPTION OF EMBODIMENTS

Definitions of terms, method of use, measurement method, etc. are as follows.

A "unit" is a generic name of an atomic group directly formed by polymerization of a monomer and an atomic group obtained by chemical conversion of a part of the atomic group formed by polymerization of a monomer. The contents (mol %) of the respective units to all the units in a polymer are determined by analysis by nuclear magnetic resonance spectroscopy, or determined also by the amounts of the respective monomers charged in production of the polymer.

"to" used to show the range of numerical values is used to include the numerical values before and after it as the lower limit value and the upper limit value.

A "(meth)acrylic" is a general name of "acrylic" and "methacrylic", and a "(meth)acrylate" is a general name of an acrylate and a methacrylate.

A "coating film" means a film formed by heating and melting, and cooling and as the case requires, curing a coating layer composed of a powder coating material.

The "melt viscosity" is a value measured by using a rotary rheometer (rheometer MCR302, manufactured by Anton Paar Japan K.K.) under a temperature-raising rate of 10° C./min.

A "hydroxy value" is a value measured in accordance with JIS K1557-1: 2007 (ISO 14900: 2001).

An "acid value" is a value measured in accordance with JIS K5601-2-1.

A "curing starting temperature" is a value measured by using a viscosity/viscoelasticity measuring apparatus ("RheoStress 6000", tradename, manufactured by EKO Instruments) at a temperature-raising rate of 10° C./min. The temperature at which the viscosity becomes 10 times the viscosity at the time of start of measurement is taken as the curing starting temperature.

The "angle of repose" is a value measured in accordance with "JIS R9301-2-2, alumina powder-part 2: Determination of physical properties-2: angle of repose", with respect to a powder coating material vacuum dried at 80° C. for 16 hours or longer.

The "average particle size" is a 50% volume average particle size (D50) measured by a laser diffraction type particle size distribution measuring apparatus (Helos-Rodos manufactured by Sympatec GmbH).

The "weight average molecular weight (Mw)" and the "number average molecular weight (Mn)" are values measured by gel permeation chromatography using polystyrene as a standard substance.

The "melting point" is a value measured by a differential scanning calorimeter.

The process for producing a coated article of the present invention is characterized by forming on the surface of a substrate a first coating layer composed of a curable powder coating material containing no fluorine atom (hereinafter sometimes referred to simply as curable powder coating material), then forming on the surface of the first coating layer a second coating layer composed of a fluorinated powder coating material, and heating the first coating layer and the second coating layer simultaneously to form a coating film on the surface of the substrate.

The present inventors have found that by "one coat one bake method" using the powder coating material disclosed in Patent Document 1, the pigment tends to be exposed to the surface of the coating film and as a result, the coating film still has problems in weather resistance. The above phenomenon is likely to occur particularly on the edge portion of the substrate.

It is found that the above problem can be overcome by so-called "two coat one bake method" of forming a first coating layer containing no fluorine atom and containing a pigment, then forming a second coating layer containing fluorine atoms and containing no pigment, and then simultaneously heating them, in the present invention.

The present inventors have further found that the coating film (a two-layer film consisting of a first coating film formed of a first coating layer and a second coating film formed of a second coating layer, hereinafter sometimes referred to as the present coating film) contained in a coated article produced by the production process of the present invention is excellent in weather resistance and is also excellent in alkali resistance, processability, impact resistance and surface smoothness.

In the production process of the present invention, first, a curable powder coating material containing a curable polymer containing no fluorine atom, a curing agent and a pigment, is applied to the surface of a substrate to form a first coating layer composed of the curable powder coating material.

The substrate is not particularly limited, and the material of the substrate may, for example, be an inorganic substance, an organic substance or an organic/inorganic composite material. The inorganic substance may, for example, be concrete, fieldstone, glass or a metal (such as iron, stainless steel, alumina, copper, brass or titanium). The organic substance may, for example, be a plastic, a rubber, an adhesive or wood. The organic/inorganic composite material may, for example, fiber-reinforced plastic, resin-reinforced concrete or fiber-reinforced concrete. Further, the substrate may have surface treatment (such as chemical conversion treatment) applied thereto.

The substrate is made of preferably a metal, more preferably aluminum or an aluminum alloy. A substrate made of aluminum or an aluminum alloy is excellent in corrosion resistance, is light in weight and is suitable for an application to building materials such as a building exterior member. The shape, the size, etc. of the substrate are not particularly limited.

In a case where a substrate made of aluminum or an aluminum alloy is used, the substrate is preferably surface-treated with a chemical conversion treatment agent. In other words, the substrate is preferably a substrate made of aluminum or an aluminum alloy having a chemical conversion treatment coating film on the surface of the substrate.

The chemical conversion treatment agent is, from the viewpoint of environmental protection, preferably a chemical conversion treatment agent containing no chromium, and from the viewpoint of the adhesion of the present coating film to the substrate, more preferably a zirconium-type or titanium-type chemical conversion treatment agent.

As the method of treating the substrate with the chemical conversion treatment agent, a method of dipping the substrate in the chemical conversion treatment agent or a method of applying the chemical conversion treatment agent to the substrate may, for example, be mentioned.

The curable powder coating material contains a curable polymer containing no fluorine atom, a curing agent and a pigment.

The curable polymer containing no fluorine atom is a non-fluorinated polymer (non-fluorinated resin) having a curable functional group.

The curable functional group is a group reactive with the after-mentioned curing agent and may, for example, be a hydroxy group, a carboxy group, an epoxy group, an oxetanyl group, an amino group, a sulfo group, an amido group, a trialkoxysilyl group or a sulfuric acid ester group.

The melt viscosity of the curable polymer containing no fluorine atom at 190° C. is, from the viewpoint of weather resistance of the present coating film, preferably from 0.1 to 10 Pa·s, more preferably from 0.6 to 10 Pa·s, particularly preferably from 1 to 6 Pa·s.

The curable polymer containing no fluorine atom is, from the viewpoint of processability and impact resistance of the present coating film, preferably at least one non-fluorinated resin containing no fluorine atom selected from the group consisting of a polyester resin, a (meth)acrylic resin and an epoxy resin.

The polyester resin is a polymer having units derived from a polycarboxylic acid (polycarboxylic acid units) and units derived from a polyhydric alcohol (polyhydric alcohol units), and the polycarboxylic acid units and the polyhydric alcohol units are connected by an ester linkage. The polyester resin may have, as the case requires, units other than these two types of units (for example, units derived from a hydroxycarboxylic acid (excluding a polycarboxylic acid)).

The polyester resin preferably has at least one of a carboxy group and a hydroxy group at the terminal of the polymer chain.

The units other than the terminal units are bivalent or higher valent units, and a linear polymer consists solely of bivalent units excluding the terminal units. That is, a linear polyester resin consists solely of bivalent units such as bivalent units derived from a polycarboxylic acid and bivalent units derived from a polyhydric alcohol, excluding the terminal units. A branched polyester resin has at least one trivalent or higher valent unit, and substantially consists solely of bivalent units other than the trivalent or higher valent unit and the terminal units. The trivalent or higher valent unit may be a unit having hydroxy groups removed from three or more carboxy groups of a trivalent or higher valent polycarboxylic acid, a unit having hydrogen atoms removed from three or more hydroxy groups of a trihydric or higher polyhydric alcohol.

The polyester resin has a curable functional group reactive with a curing agent.

At least a part of the terminal units of the polymer chain of the polyester resin, are preferably a monovalent polycarboxylic acid unit or a monovalent polyhydric alcohol unit, and a free carboxy group of the unit in the former case or a free hydroxy group of the unit in the latter case functions as a curable functional group. The unit having a curable functional group may be a unit other than the terminal unit. For example, a bivalent polyhydric alcohol unit derived from a polyhydric alcohol having three or more hydroxy groups is a unit having a free hydroxy group. Accordingly, the polyester resin may have a bivalent or higher valent unit having the curable functional group.

The hydroxy value of the polyester resin is preferably from 20 to 100 mgKOH/g, more preferably from 20 to 80 mgKOH/g. The acid value of the polyester resin is preferably from 0.5 to 80 mgKOH/g, more preferably from 0.5 to 50 mgKOH/g. When the polyester resin has a hydroxy value and an acid value within the above ranges, the present coating film will be more excellent in impact resistance.

Mn of the polyester resin is preferably at most 5,000, whereby the melt viscosity of the first coating layer will be moderately low. Mw of the polyester resin is preferably from 2,000 to 20,000, more preferably from 2,000 to 10,000, whereby the melt viscosity of the first coating layer will be moderately low.

The polycarboxylic acid is preferably a $C_{8-15}$ aromatic polycarboxylic acid, specifically, phthalic acid, isophthalic acid, terephthalic acid, naphthalene dicarboxylic acid, trimellitic acid, pyromellitic acid or phthalic anhydride.

The polyhydric alcohol is preferably an aliphatic polyhydric alcohol or an alicyclic polyhydric alcohol, in view of excellent adhesion between the first coating film and the substrate and flexibility of the first coating film, more preferably an aliphatic polyhydric alcohol.

The polyhydric alcohol is preferably a $C_{2-10}$ polyhydric alcohol. It may, for example, be specifically ethylene glycol, diethylene glycol, triethylene glycol, 1,2-propanediol, 1,3-propanediol, 1,3-butanediol, 1,4-butanediol, 1,5-pentanediol, neopentyl glycol, spiroglycol, 1,10-decanediol, 1,4-cyclohexanedimethanol, trimethylolethane, trimethylolpropane, glycerin or pentaerythritol.

The (meth)acrylic resin is a polymer having units based on a (meth)acrylate. The (meth)acrylic resin preferably has curable functional groups such as carboxy groups, hydroxy groups or sulfo groups.

The epoxy resin is a polymer having at least two epoxy groups in its molecule. The epoxy resin may further have a reactive group other than the epoxy groups. The epoxy resin may, for example, be a bisphenol A epoxy resin or a bisphenol F epoxy resin.

The curing agent reacts with the curable functional group to crosslink polymer molecules each having the curable functional group to cure the polymer.

The curing agent has at least two reactive functional groups reactive with a curable functional group (such as a hydroxy group or a carboxy group). The reactive functional group may, for example, be an isocyanate group, a blocked isocyanate group, an alkoxysilyl group, a carbodiimide group, an oxazoline group, an epoxy group, an alkylated methylol group, a hydrazide group or a β-hydroxyalkylamide group.

The curing agent is preferably a blocked isocyanate type, an amine type (such as a melamine resin, a guanamine resin, a sulfonamide resin, a urea resin or an aniline resin), an epoxy type, a β-hydroxyalkylamide type or a triglycidyl isocyanurate type.

The blocked isocyanate type curing agent is preferably one which is solid at 25° C. The blocked isocyanate type curing agent is preferably a blocked isocyanate type curing agent obtained by reacting an aliphatic, aromatic or araliphatic diisocyanate and a low molecular weight compound having active hydrogen to obtain a polyisocyanate, which is further reacted with a blocking agent.

The diisocyanate may, for example, be tolylene diisocyanate, 4,4'-diphenylmethane isocyanate, xylylene diisocyanate, hexamethylene diisocyanate, 4,4'-methylenebis(cyclohexylisocyanate), methylcyclohexane diisocyanate, bis(isocyanatomethyl)cyclohexane isophorone diisocyanate, dimer acid diisocyanate or lysine diisocyanate.

The low molecular weight compound having active hydrogen may, for example, be water, ethylene glycol, propylene glycol, trimethylolpropane, glycerin, sorbitol, ethylenediamine, ethanolamine, diethanolamine, hexamethylenediamine, isocyanurate, uretdione, low molecular weight polyester having a hydroxy group, or polycaprolactone.

The blocking agent may, for example, be an alcohol type compound (such as methanol, ethanol or benzyl alcohol), a phenol type compound (such as phenol or cresol), a lactam type compound (such as caprolactam or butyrolactam), or an oxime type compound (such as cyclohexanone, oxime or methyl ethyl ketoxime).

The pigment is preferably at least one member selected from the group consisting of a luster pigment, an anticorrosive pigment, a coloring pigment and an extender pigment.

A luster pigment is a pigment to impart luster to the coating film. As the luster pigment, aluminum powder, nickel powder, stainless steel powder, copper powder, bronze powder, gold powder, silver powder, mica powder, graphite powder, glass flakes, a scale-like iron oxide powder or the like, may be mentioned.

An anticorrosive pigment is a pigment to prevent corrosion (rust) or deterioration of the substrate. As the anticorrosive pigment, a lead-free anticorrosive pigment presenting little impact on the environment is preferred. As the lead-free anticorrosive pigment, zinc cyanamide, zinc oxide, zinc phosphate, calcium magnesium phosphate, zinc molybdate, barium borate or zinc calcium cyanamide, may, for example, be mentioned.

A coloring pigment is a pigment to color the coating film. As the coloring pigment, titanium oxide, carbon black, iron oxide, phthalocyanine blue, phthalocyanine green, quinacridone, isoindolinone, benzimidazolone or a dioxazine may, for example, be mentioned.

An extender pigment is a pigment to improve hardness of the coating film and to increase the thickness of the coating film. An extender pigment is preferably incorporated, since it is possible to make the cut surface of the present coating film clean, when a coated article such as a building exterior member is cut. The extender pigment may, for example, be talc, barium sulfate, mica or calcium carbonate.

The pigment is preferably a titanium oxide pigment containing titanium oxide (titanium oxide particles) from the viewpoint of the outer appearance and the weather resistance of the present coating film. It is particularly preferred that at least one type of atom selected from the group consisting of Zr, Si and Al is present on the surface of titanium oxide. For example, the pigment may be a pigment having titanium oxide surface-treated with a material containing the above atom. The pigment may be covered with a resin.

The pigment is preferably in the form of particles. The average particle size of the pigment is properly set depending upon the application of the pigment and is usually from 0.15 to 0.5 μm.

The curable powder coating material may further contain other component. Such other component may, for example, be a ultraviolet absorber, a curing catalyst, a light stabilizer (such as a hindered amine type light stabilizer), a matting agent (such as ultrafine synthetic silica), a plasticizer, a surfactant (a nonionic surfactant, a cationic surfactant, or an anionic surfactant), a leveling agent, a surface modifier (to improve the surface smoothness of the coating film), a degassing agent (having a function to discharge air included in the powder, a gas from the curing agent, moisture, etc. out of the coating film, and it is normally solid, but when melted, it becomes to have very low viscosity), a filler, a heat stabilizer, a thickener, a dispersing agent, an antistatic agent, a rust inhibitor, a silane coupling agent, an antifouling agent, a low-staining agent, etc.

The curable powder coating material preferably contains an ultraviolet absorber from the viewpoint of the weather resistance of the present coating film.

As the ultraviolet absorber, either an organic ultraviolet absorber or an inorganic ultraviolet absorber may be used. The ultraviolet absorber may be used alone, or may be used in combination of two or more.

The organic ultraviolet absorber may, for example, be a salicylate type, a benzotriazole type, a hydroxyphenyltriazine type, a benzophenone type or a cyanoacrylate type.

The organic ultraviolet absorber is preferably a compound having a molecular weight of from 200 to 1,000. When the molecular weight is at least 200, it is less likely to volatilize during formation of the coating film, and it can be retained in the coating film. When the molecular weight is at most 1,000, the organic ultraviolet absorber is likely to be dispersed in the coating film.

As the inorganic ultraviolet absorber, a filler-type inorganic ultraviolet absorber containing an ultraviolet absorbing oxide (such as zinc oxide or cerium oxide) may be mentioned.

The inorganic ultraviolet absorber is preferably composite particles of zinc oxide and titanium oxide, composite particles of cerium oxide and titanium oxide, composite particles of zinc oxide and cerium oxide, or composite particles of titanium oxide, zinc oxide and cerium oxide.

The content of the curable polymer containing no fluorine atom in the curable powder coating material is preferably from 40 to 90 mass %, more preferably from 50 to 80 mass % based on the total mass of the curable powder coating material, from the viewpoint of the curing property of the curable powder coating material.

The content of the curing agent in the curable powder coating material is preferably from 1 to 50 parts by mass, more preferably from 3 to 30 parts by mass per 100 parts by mass of the curable polymer, from the viewpoint of the curing property of the curable powder coating material. Further, the content of the pigment in the curable powder coating material is preferably from 20 to 200 parts by mass, more preferably from 50 to 150 parts by mass per 100 parts by mass of the curable polymer from the viewpoint of the weather resistance of the curable powder coating material.

The curing starting temperature of the curable powder coating material is preferably from 150 to 220° C. from the viewpoint of the weather resistance of the present coating film.

The angle of repose of the curable powder coating material is preferably from 30 to 50°, more preferably from 35 to 45°, from the viewpoint of more excellent effects of the present invention.

The average particle size of the powder contained in the curable powder coating material is preferably from 10 to 50 μm, more preferably from 12 to 45 μm from the viewpoint of the surface smoothness, the thickness uniformity and the processability of the present coating film.

The curable powder coating material may be produced by a known method. Specifically, first, the curable polymer containing no fluorine atom, the curing agent, the pigment, and other component to be added as the case requires, are mixed by a mixer to obtain a mixture. Then, the obtained mixture is melt-kneaded by a single screw extruder, a twin screw extruder, planetary gears or the like, and the obtained kneaded product is pulverized by a pulverizer. Then, as the case requires, the pulverized product obtained by pulverization is classified. The powder coating material is obtained in such a manner. The respective components are preferably pulverized to be in a powder form. The kneaded product is preferably pelletized after cooling.

In the process for producing a coated article of the present invention, first, the above-described curable powder coating material is applied to the surface of a substrate to form a first coating layer composed of the curable powder coating material.

The coating method may, for example, an electrostatic coating method, an electrostatic spraying method, an electrostatic immersion method, a misting method, a fluidized bed coating method, a blowing method, a spraying method, a thermal spraying method or a plasma spraying method. Among them, an electrostatic coating method employing a powder coating gun is preferred.

When the curable powder coating material is applied to the surface of a substrate by an electrostatic coating method, the applied voltage (V1) is preferably from −100 to −20 kV, more preferably from −80 to −30 kV.

The thickness of the first coating layer is preferably from 20 to 1,000 μm, more preferably from 20 to 500 μm, particularly preferably from 20 to 300 μm.

According to the process for producing a coated article of the present invention, after the first coating layer is formed, a fluorinated powder coating material containing a fluorinated polymer and containing no pigment is applied to the surface of the first coating layer to form a second coating layer composed of the fluorinated powder coating material.

The fluorinated powder coating material contains a fluorinated polymer and contains no pigment.

The fluorinated polymer is preferably a curable fluorinated polymer having a curable functional group or polyvinylidene fluoride (hereinafter sometimes referred to as PVDF). The definition of the curable functional group is as described above.

The curable fluorinated polymer having a curable functional group is preferably a curable fluorinated polymer having at least one type of functional group selected from the group consisting of a hydroxy group and a carboxy group.

A coating film formed from a powder coating material containing a curable fluorinated polymer is more excellent in antifouling property, water resistance, acid resistance and alkali resistance. Further, a coating film formed from a powder coating material containing PVDF is more excellent in flexibility and impact resistance. The curable fluorinated polymer and PVDF may be used in combination.

The fluorinated polymer may be produced by a known radical polymerization method, and the polymerization form may, for example, be emulsion polymerization, suspension polymerization or solution polymerization.

The curable fluorinated polymer preferably has at least one type of group selected from the group consisting of a hydroxy group and a carboxy group from the viewpoint of impact resistance of the present coating film. That is, the curable fluorinated polymer has units based on a fluoroolefin, units based on at least one member selected from the group consisting of a monomer having a hydroxy group (hereinafter sometimes referred to as a monomer 1) and a monomer having a carboxy group (hereinafter sometimes referred to as a monomer 3), copolymerizable with a fluoroolefin, and units based on a monomer other than the fluoroolefin, the monomer 1 and the monomer 3 (hereinafter sometimes referred to as a monomer 2).

The fluoroolefin is an olefin in which at least one hydrogen atom is substituted by a fluorine atom. In the fluoroolefin, at least one hydrogen atom not substituted by a fluorine atom, may be substituted by a chlorine atom.

The fluoroolefin is preferably at least one member selected from the group consisting of $CF_2=CF_2$, $CF_2=CFCl$, $CF_2=CFCF_3$ and $CF_2=CH_2$, more preferably $CF_2=CF_2$ or $CF_2=CFCl$. The fluoroolefin may be used alone or in combination of two or more.

The monomer to be copolymerized with the fluoroolefin may be a monomer containing a fluorine atom other than the fluoroolefin, but is preferably a monomer containing no fluorine atom, more preferably a vinyl monomer containing no fluorine atom. The vinyl monomer is a polymerizable compound having a carbon-carbon double bond, and is a monomer having excellent alternating copolymerizability with the fluoroolefin.

The vinyl monomer may, for example, be a vinyl ether, an allyl ether, a carboxylic acid vinyl ester, a carboxylic acid allyl ester or an olefin.

The monomer 1 is a vinyl monomer having a hydroxy group and may, for example, be allyl alcohol, a hydroxyalkyl vinyl ether (such as 2-hydroxyethyl vinyl ether, 4-hydroxybutyl vinyl ether, cyclohexanediol monovinyl ether), a hydroxyalkyl allyl ether (such as 2-hydroxyethyl allyl ether), a vinyl hydroxyalkanoate (such as vinyl hydroxypropionate) or a hydroxyalkyl (meth)acrylate (such as hydroxyethyl (meth)acrylate). The monomer 1 may be used alone or in combination of two or more.

The monomer 3 is a vinyl monomer having a carboxy group and may, for example, be $CH_2=CHCOOH$, $CH(CH_3)=CHCOOH$, $CH_2=C(CH_3)COOH$ or a compound represented by the formula $CH_2=CH(CH_2)_{n1}COOH$ (wherein n1 is an integer of from 1 to 10). The monomer 3 may be used alone or in combination of two or more.

Either one of the monomer 1 and the monomer 3 may be contained, or both may be contained.

The monomer 2 is a vinyl monomer other than the monomer 1 and the monomer 3, and the monomer 2 may, for example, be a vinyl ether, an allyl ether, a carboxylic acid vinyl ester, a carboxylic acid allyl ester or an olefin, having no hydroxy group nor carboxy group.

The vinyl ether may, for example, be specifically a cycloalkyl vinyl ether (such as cyclohexyl vinyl ether), or an alkyl vinyl ether (such as nonyl vinyl ether, 2-ethylhexyl vinyl ether, hexyl vinyl ether, ethyl vinyl ether, n-butyl vinyl ether or tert-butyl vinyl ether).

The allyl ether may, for example, be specifically an alkyl allyl ether (such as ethyl allyl ether or hexyl allyl ether).

The carboxylic acid vinyl ester may, for example, be specifically a vinyl ester of a carboxylic acid (such as acetic acid, butyric acid, pivalic acid, benzoic acid or propionic acid). Further, as a vinyl ester of a carboxylic acid having a branched alkyl group, commercially available VeoVa 9 and VeoVa 10 (each manufactured by Shell Chemicals, tradenames) may be used.

The carboxylic acid allyl ester may, for example, be specifically an allyl ester of a carboxylic acid (such as acetic acid, butyric acid, pivalic acid, benzoic acid or propionic acid).

The olefin may, for example, be specifically ethylene, propylene or isobutylene.

The proportion of the units based on the fluoroolefin is preferably from 30 to 70 mol %, more preferably from 40 to 60 mol % based on all the units of the curable fluorinated polymer. When the proportion is at least 30 mol %, the present coating film will be more excellent in weather resistance, and when it is at most 70 mol %, the present coating film will be more excellent in antifouling property, water resistance, acid resistance and alkali resistance.

The proportion of the units based on the monomer 1 and the units based on the monomer 3 is preferably from 0.5 to 20 mol %, more preferably from 1 to 15 mol % based on all the units in the curable fluorinated polymer. When the proportion is at least 0.5 mol %, the present coating film will be more excellent in antifouling property, water resistance, acid resistance and alkali resistance, and when it is at most 20 mol %, the present coating film will be excellent in scuff resistance.

The curable fluorinated polymer may contain either one of the units based on the monomer 1 and the units based on the monomer 3, or may contain both the units. That is, the total proportion of the units based on the monomer 1 and the units based on the monomer 3 is within the above range.

The proportion of the units based on the monomer 2 is preferably from 20 to 60 mol %, more preferably from 30 to 50 mol % based on all the units in the curable fluorinated polymer. When the proportion is at least 20 mol %, the glass transition temperature of the curable fluorinated polymer will be appropriate, and a powder coating material will easily be produced. When the proportion is at most 60 mol %, blocking of the present coating film will be more suppressed, and the present coating film will be more excellent in flexibility.

Mn of the curable fluorinated polymer is preferably from 3,000 to 50,000, more preferably from 5,000 to 30,000. When Mn is at least 3,000, the present coating film will be excellent in water resistance and salt water resistance. When Mn is at most 50,000, the present coating film will be excellent in surface smoothness.

At least one of the hydroxy value and the acid value of the curable fluorinated polymer is preferably from 5 to 100 mgKOH/g, more preferably from 10 to 80 mgKOH/g, from the viewpoint of the curing property and the impact resistance of the present coating film.

In a case where the curable fluorinated polymer has carboxy groups, the curable fluorinated polymer may be obtained by reacting a hydroxy group of a curable fluorinated polymer having hydroxy groups and an acid anhydride in an organic solvent to form an ester linkage and a carboxy group. Otherwise, a curable fluorinated polymer having a hydroxy group and an acid anhydride may be melt-kneaded so that the hydroxy group of the curable fluorinated polymer having a hydroxy group and an acid anhydride are reacted to form an ester linkage and a carboxy group.

The acid anhydride may be a dibasic acid anhydride. The anhydride acid anhydride may, for example, be succinic anhydride, glutaric anhydride, itaconic anhydride, 1,2-cyclohexanedicarboxylic anhydride (hexahydrophthalic anhydride), cis-4-cyclohexene-1,2-dicarboxylic anhydride, phthalic anhydride, 4-methylhexahydrophthalic anhydride, 1,8-naphthalic anhydride or maleic anhydride.

PVDF is a polymer composed of units based on vinylidene fluoride. Mw is preferably from 100,000 to 500,000, more preferably from 150,000 to 400,000, from the viewpoint of the flexibility of the present coating film. Mn is preferably from 50,000 to 400,000, more preferably from 100,000 to 300,000.

The melting point of PVDF is preferably from 100 to 250° C., more preferably from 140 to 200° C.

The melt viscosity of the fluorinated polymer at 190° C. is preferably higher than the melt viscosity of the curable polymer containing no fluorine atom at 190° C., from the viewpoint of the weather resistance of the present coating film. Further, the melt viscosity of the fluorinated polymer is preferably from 5 to 10 Pa·s, more preferably from 6 to 10 Pa·s, from the viewpoint of the weather resistance of the coating film.

As described above, when the melt viscosity of the curable polymer containing no fluorine atom at 190° C. is at least 0.1 Pa·s, the first coating layer is melted while it keeps a proper thickness, and suitably spreads on the substrate, at 190° C. Further, when the melt viscosity of the fluorinated polymer at 190° C. is higher than the melt viscosity of the curable polymer containing no fluorine atom at 190° C., the second coating layer will follow the first coating layer and they suitably adhere to each other, at 190° C. In addition, when the melt viscosity of the fluorinated polymer at 190° C. is at most 10 Pa·s, a coating film will be obtained in which the particles of the fluorinated polymer are uniformly dispersed. The present coating film formed in such a manner is excellent in weather resistance since it is a uniform coating film with no void, such that adhesion between the substrate and the first coating layer, and adhesion between the first coating layer and the second coating layer, are favorable.

The fluorinated powder coating material contains no pigment. Here, "containing no pigment" means that substantially no pigment is contained. Specifically, "containing no pigment" means that the content of the pigment is at most 1.0 mass % based on the total mass of the fluorinated powder coating material, and is preferably at most 0.1 mass %, further preferably 0 mass %.

When the fluorinated powder coating material to form the second coating layer contains no pigment, the pigment will not be exposed to the surface of the coating film, and the present coating film will be excellent in weather resistance.

The fluorinated powder coating material may contain a component other than the above-described fluorinated polymer. That is, the fluorinated powder coating material may contain a component which may be contained in the above-described curable powder coating material, except for the pigment.

Particularly, the fluorinated powder coating material preferably contains a polymer (e.g. a polyester resin, a meth (acrylic) resin or an epoxy resin) other than the fluorinated polymer, from the viewpoint of the flexibility of the present coating film and the adhesion between layers.

Further, the fluorinated powder coating material preferably contains the above-described ultraviolet absorber. The ultraviolet absorber contained in the fluorinated powder coating material is preferably a hydroxyphenyltriazine type with a view to effectively suppressing deterioration of the present coating film. When the ultraviolet absorber is contained in the fluorinated powder coating material, the weather resistance will more improve, and particularly peeling between the first coating film and the second coating film can be suppressed.

Further, the fluorinated powder coating material may contain a curing agent. Particularly in a case where the fluorinated polymer is a curable fluorinated polymer, the fluorinated powder coating material preferably contains a curing agent.

The curing agent is as described above, and is preferably a curing agent having at least two groups per molecule of at least one type reactive with a hydroxy group or a carboxy group, selected from the group consisting of an isocyanate group, a blocked isocyanate group, an alkoxysilyl group, a carbodiimide group, an oxazoline group, an epoxy group, an alkylated methylol group, a hydrazide group and a β-hydroxyalkylamide group.

The fluorinated powder coating material preferably contains the curable fluorinated polymer and the curing agent and contains no pigment, from the viewpoint of the weather resistance of the present coating film.

The content of the fluorinated polymer in the fluorinated powder coating material is preferably from 40 to 100 mass %, more preferably from 50 to 90 mass % based on the total mass of the fluorinated powder coating material from the viewpoint of handling efficiency of the fluorinated powder coating material.

In a case where the fluorinated powder coating material contains a curing agent, the content of the curing agent is preferably from 1 to 50 mass %, more preferably from 3 to 30 mass % based on the total mass of the fluorinated polymer contained in the fluorinated powder coating material, from the viewpoint of the curing property of the fluorinated powder coating material.

In a case where the fluorinated polymer is the curable fluorinated polymer, the curing starting temperature of the fluorinated powder coating material is preferably from 150 to 200° C. from the viewpoint of the weather resistance of the present coating film. Further, the absolute value of the difference between the curing starting temperature of the curable powder coating material and the curing starting temperature of the fluorinated powder coating material is preferably at most 30° C. with a view to more suppressing peeling at the interface between the first coating film and the second coating film.

The angle of repose of the fluorinated powder coating material is preferably from 30 to 50°, more preferably from 35 to 45°, from the viewpoint of more excellent effects of the present invention. Further, the absolute value of the difference between the angle of repose of the curable powder coating material and the angle of repose of the fluorinated powder coating material is preferably within 20°, more preferably within 10°, from the viewpoint of more excellent effects of the present invention.

The average particle size of the powder contained in the fluorinated powder coating material is preferably from 10 to 50 μm, more preferably from 12 to 45 μm from the viewpoint of the surface smoothness, the thickness uniformity and processability of the present coating film.

For the method for producing the fluorinated powder coating material, the same method for producing the curable powder coating material may be applied.

In the case of applying the fluorinated powder coating material to the surface of the first coating layer to form the second coating layer composed of the fluorinated powder coating material, the coating method may, for example, be an electrostatic coating method, an electrostatic spraying method, an electrostatic immersion method, a misting method, a fluidized bed coating method, a blowing method, a spraying method, a thermal spraying method or a plasma spraying method. Among them, an electrostatic coating method using a powder coating gun is preferred.

When the fluorinated powder coating material is applied to the surface of the first coating layer by an electrostatic coating method, the applied voltage (V2) is preferably from −100 to −20 kV, more preferably from −80 to −30 kV.

Further, with a view to obtaining a coating film having high glossiness, the applied voltage (V2) at the time of electrostatic coating of the fluorinated powder coating material to the applied voltage (V1) at the time of electrostatic coating of the curable powder coating material is preferably within a range of the applied voltage (V1)±100 kV, more preferably within a range of the applied voltage (V1)±50 kV. That is, the applied voltage V2 is preferably within a range of from (applied voltage (V1)−100 kV) to (applied voltage (V1)+100 kV), more preferably within a range of from (applied voltage (V1)−50 kV) to (applied voltage (V1)+50 kV).

The thickness of the second coating layer is not particularly limited and is preferably from 20 to 1,000 μm, more preferably from 20 to 500 μm, particularly preferably from 20 to 300 μm.

According to the process for producing a coated article of the present invention, the first coating layer and the second coating layer are formed in this order on the surface of the substrate, and then the first coating layer and the second coating layer are simultaneously heated to form the present coating film. Specifically, a heat treatment (heating and melting treatment) is applied to the first coating layer and the second coating layer on the substrate to form a molten film in a molten state formed from a melt of the powder coating material, which is cooled and solidified to form the present coating film.

In the first coating layer, reaction of the curable polymer and the curing agent proceeds. Further, in a case where the second coating layer contains the curable fluorinated polymer and the curing agent, the reaction of the curable fluorinated polymer and the curing agent proceeds.

The heating temperature (hereinafter sometimes referred to as baking temperature) and the heating retention time (hereinafter sometimes referred to as baking time) to melt the powder coating material (the curable powder coating material and the fluorinated powder coating material) and to maintain the molten state for a predetermined time are suitably set depending upon the types and composition of raw material components of the powder coating material, the desired film thickness, etc. The baking temperature is usually from 100 to 300° C., and from the viewpoint of the weather resistance of the present coating film, preferably at most 200° C. Further, the baking time is usually from 1 to 60 minutes.

According to the present invention, by the above procedure, a coated article excellent in weather resistance will be obtained. The coated article comprises the substrate and the coating film disposed on the substrate. The coating film comprises the first coating film formed from the curable powder coating material and the second coating film formed from the fluorinated powder coating material disposed on the first coating film.

The thicknesses of the first coating film and the second coating film are respectively preferably from 20 to 1,000 µm, more preferably from 20 to 500 µm, particularly preferably from 20 to 300 µm.

The coated article may, for example, be a building exterior member (such as a roof, an aluminum composite panel, an aluminum panel for a curtain wall, an aluminum frame for a curtain wall or an aluminum window frame), a road material (such as a signal machine, a telephone pole, a road sign pole or a guard rail), a car body or parts (bumper, wiper blade, tire wheel, etc.), a household appliance (outdoor unit of air conditioner, water heater exterior, etc.), blades for window power generator, a solar cell back sheet, a back surface of a heat collection mirror for solar power generator, an eggplant battery exterior, an electric generator, etc.

EXAMPLES

Now, the present invention will be described in further detail with reference to Examples. However, the present invention is by no means restricted to such specific Examples. The amounts of the respective components in the after-described Tables are on the mass basis.

<Components Used for Preparation of Powder Coating Material>

Polyester resin A1: manufactured by DAICEL-ALLNEX LTD., CRYLCOAT (tradename) 4890-0, hydroxy value: 30 mgKOH/g, melt viscosity: 5.25 Pa·s (190° C.)

Polyester resin A2: manufactured by DAICEL-ALLNEX LTD., CRYLCOAT (tradename) 4842-3, acid value: 36 mgKOH/g, melt viscosity: 1.83 Pa·s (190° C.)

Polyester resin A3: manufactured by DSM, Uralac (tradename) P6504, hydroxy value: 40 mgKOH/g, melt viscosity: 3.06 Pa·s (190° C.)

Polyester resin A4: manufactured by DSM, Uralac (tradename) P1680, hydroxy value: 30 mgKOH/g, melt viscosity: 0.88 Pa·s (190° C.)

Polyester resin A5: manufactured by Japan U-pica co., ltd., U-pica Coat (tradename) GV-110, hydroxy value: 49 mgKOH/g, melt viscosity: 2.95 Pa·s (190° C.)

Polyester resin A6: manufactured by Japan U-pica co., ltd., U-pica Coat (tradename) GV-740, hydroxy value: 50 mgKOH/g, melt viscosity: 1.69 Pa·s (190° C.)

Polyester resin A7: manufactured by TOYOBO CO., LTD., VYLON (tradename) 220, hydroxy value: 50 mgKOH/g, melt viscosity: 0.55 Pa·s (190° C.)

The above polyester resins A1 to A7 correspond to the curable polymer containing no fluorine atom.

Fluorinated polymer B1: manufactured by Asahi Glass Company, Limited, LUMIFLON (registered trademark) LF710F, hydroxy value: 50 mgKOH/g, melt viscosity: 7.38 Pa·s (190° C.), Mn: 10,000 (corresponding to curable fluorinated polymer)

Fluorinated polymer B2: PVDF, melt viscosity: 1,500 Pa·s (190° C.), Mw: 250,000

Titanium oxide pigment: manufactured by DuPont, Ti-Pure (tradename) R960, titanium oxide content: 89 mass %

Curing agent 1: blocked isocyanate type curing agent (manufactured by Evonik Industries, VESTAGON (tradename) B1530)

Curing agent 2: glycidyl ester type curing agent (manufactured by HUNTSMAN, Araldite (tradename) PT910)

Curing agent 3: triazine skeleton-containing trifunctional epoxy type curing agent (manufactured by Nissan Chemical Industries, Ltd., TEPIC-SP)

Curing agent 4: (3-hydroxyalkylamide type curing agent (Primid (tradename) XL552)

Aluminum pigment: manufactured by TOYO ALUMINIUM K.K., tradename "PCF7620A", covering material: acryl resin Curing catalyst: a xylene solution of dibutyltin dilaurate (10,000-fold diluted)

Ultraviolet absorber: manufactured by BASF, Tinuvin (tradename) 405 (hydroxyphenyltriazine type ultraviolet absorber)

Light stabilizer: manufactured by BASF, Tinuvin (tradename) 111FDL

Degassing agent: benzoin

Surface modifier: manufactured by BYK-Chemie, BYK (tradename)-360P

Plasticizer: 1,4-cyclohexanedimethanol dibenzoate (manufactured by Velsicol Chemical, Benzoflex (tradename) 352, melting point: 118° C., molecular weight: 352)

Production Examples 1 to 11

Production of Polyester Powder Coating Material

The components as identified in Table 1 or 2 were mixed in a powder state by a high speed mixer. The obtained mixture was melt-kneaded by a twin screw extruder (manufactured by THERMO PRISM, 16 mm extruder) at a barrel set temperature of 120° C. to obtain pellets. The obtained pellets were pulverized at 25° C. using a pulverizer, and the obtained pulverized product was classified by means of 150 mesh to obtain each of powder coating materials A1 to A11 having an average particle size of about 40 µm. The amounts of the components in Tables 1 and 2 are net amounts.

In Tables 1 and 2, "difference with curing starting temperature of fluorinated powder coating material (° C.)" means a difference between the curing starting temperature of the polyester powder coating material and the curing starting temperature of the powder coating material B1 among the after-described fluorinated powder coating materials.

TABLE 1

| | | Production Example 1 | Production Example 2 | Production Example 3 | Production Example 4 | Production Example 5 | Production Example 6 | Production Example 7 |
|---|---|---|---|---|---|---|---|---|
| Raw material composition (parts by mass) | Polyester resin A1 | 56.6 | — | — | — | — | — | 56.6 |
| | Polyester resin A3 | — | 54.2 | — | — | — | — | — |
| | Polyester resin A4 | — | — | 56.6 | — | — | — | — |
| | Polyester resin A5 | — | — | — | 52.3 | — | — | — |
| | Polyester resin A6 | — | — | — | — | 52 | — | — |
| | Polyester resin A7 | — | — | — | — | — | 52 | — |
| | Titanium oxide pigment | 35 | 35 | 35 | 35 | 35 | 35 | — |
| | Aluminum pigment | — | — | — | — | — | — | 5 |
| | Curing agent 1 | 8.4 | 10.8 | 8.4 | 12.7 | 13 | 13 | 8.4 |
| | Degassing agent | 0.4 | 0.4 | 0.4 | 0.4 | 0.4 | 0.4 | 0.4 |
| | Surface modifier | 1 | 1 | 1 | 1 | 1 | 1 | 1 |
| | Light stabilizer | 0.2 | 0.2 | 0.2 | 0.2 | 0.2 | 0.2 | 0.2 |
| | Curing catalyst | 0.1 | 0.1 | 0.1 | 0.1 | 0.1 | 0.1 | 0.1 |
| | Total | 101.7 | 101.7 | 101.7 | 101.7 | 101.7 | 101.7 | 71.7 |
| Melt viscosity of polyester resin Pa · s (190° C.) | | 5.25 | 3.06 | 0.88 | 2.95 | 1.69 | 0.55 | 5.25 |
| Curing starting temperature (° C.) | | 195 | 191 | 187 | 203 | 200 | 196 | 195 |
| Difference with curing starting temperature of fluorinated powder coating material (° C.) | | 18 | 14 | 10 | 26 | 23 | 18 | 18 |
| Angle of repose (°) | | 38.0 | 38.5 | 39.2 | 39.9 | 40.1 | 38.3 | 41.1 |
| Powder coating material | | A1 | A2 | A3 | A4 | A5 | A6 | A7 |

TABLE 2

| | | Production Example 8 | Production Example 9 | Production Example 10 | Production Example 11 |
|---|---|---|---|---|---|
| Raw material composition (parts by mass) | Polyester resin A1 | — | — | — | 56.6 |
| | Polyester resin A2 | 58.4 | 60.2 | 61 | — |
| | Titanium oxide pigment | 35 | 35 | 35 | — |
| | Curing agent 1 | — | — | — | 8.4 |
| | Curing agent 2 | 6.6 | — | — | — |
| | Curing agent 3 | — | 4.8 | — | — |
| | Curing agent 4 | — | — | 4 | — |
| | Degassing agent | 0.4 | 0.4 | 0.4 | 0.4 |
| | Surface modifier | 1 | 1 | 1 | 1 |
| | Light stabilizer | 0.2 | 0.2 | 0.2 | 0.2 |
| | Curing catalyst | 0.1 | 0.1 | 0.1 | 0.1 |
| | Total | 101.7 | 101.7 | 101.7 | 101.7 |
| Melt viscosity of polyester resin Pa · s (190° C.) | | 1.83 | 1.83 | 1.83 | 1.83 |
| Curing starting temperature (° C.) | | 158 | 155 | 160 | 160 |
| Difference with curing starting temperature of fluorinated powder coating material(° C.) | | 19 | 22 | 17 | 17 |
| Angle of repose (°) | | 38.5 | 39.1 | 39.5 | 39.5 |
| Powder coating material | | A8 | A9 | A10 | A11 |

Production Example 12

Production of Fluorinated Powder Coating Material

Fluorinated polymer B1 (52.0 g), curing agent 1 (13.0 g) (INDEX=1), degassing agent (0.4 g), surface modifier (1.0 g), ultraviolet absorber (0.1 g) and plasticizer (3.0 g) were mixed in a powder state by a high speed mixer. The obtained mixture was melt-kneaded by a twin screw extruder at a barrel set temperature of 120° C. to obtain pellets.

The obtained pellets were pulverized at 25° C. by means of a pulverizer, and the obtained pulverized product was classified by means of a 150 mesh sieve to obtain powder coating material B1 having an average particle size of about 40 μm (angle of repose: 35.2°, curing starting temperature: 177° C.).

Production Example 13

Production of Fluorinated Powder Coating Material

Fluorinated polymer B1 (27.5 g), polyester resin A1 (27.5 g), curing agent 1 (18.0 g) (INDEX=1), degassing agent (0.6 g), surface modifier (1.0 g), ultraviolet absorber (0.1 g) and plasticizer (3.0 g) were mixed in a powder state by a high speed mixer. The obtained mixture was melt-kneaded by a twin screw extruder at a barrel set temperature of 120° C. to obtain pellets. The obtained pellets were pulverized at 25° C. by a pulverizer, and the obtained pulverized product was classified by means of a 150 mesh sieve to obtain powder coating material B2 having an average particle size of about 40 μm (angle of repose: 37.1°, curing starting temperature: 177° C.).

Production Example 14 to 16

Production of Fluorinated Powder Coating Material

Powder coating material B3 having an average particle size of about 40 μm (angle of repose: 35.0° was obtained in the same manner as in Production Example 12 except that fluorinated polymer B2 was used instead of fluorinated polymer B1, and no curing agent 1 was added.

Further, powder coating material B4 having an average particle size of about 40 μm (angle of repose: 35.2°, curing starting temperature: 177° C.) was obtained in the same manner as in Production Example 12 except that no ultraviolet absorber was added.

Further, powder coating material B5 having an average particle size of about 40 μm (angle of repose: 35.1°, curing starting temperature: 177° C.) was obtained in the same manner as in Production Example 12 except that titanium oxide pigment (35 g) was added.

Production Example 17

Production of Fluorinated Powder Coating Material

Components as identified in Production Example 1 and components as identified in Production Example 12 excluding the ultraviolet absorber were mixed in a powder state by a high speed mixer. The obtained mixture was melt-kneaded by a twin screw extruder at a barrel set temperature of 120° C. to obtain pellets. The obtained pellets were pulverized at 25° C. by a pulverizer, and the obtained pulverized product was classified by means of a 150 mesh sieving to obtain powder coating material B6 having an average particle size of about 40 μm (angle of repose: 37.2°, curing starting temperature: 177° C.).

Production Example 18

Production of Aluminum Plate (Substrate) Provided With Chemical Conversion Treatment Coating Film In a treatment bath (concentration: 30 g/L, temperature: 55° C.) prepared by diluting a treating agent (manufactured by The Japan Cee-Bee Chemical Co., Ltd., tradename: Chemicleaner 514A) diluted with deionized water, an aluminum plate (JIS A6063S-T5) having a size of 150 mm×70 mm×2 mm in thickness was dipped for 5 minutes to conduct degreasing treatment to the surface of the aluminum plate. Then, the aluminum plate having the degreasing treatment applied thereto was washed with deionized water of 25° C. for one minute.

Then, in a treatment bath (concentration: 250 g/L, temperature: 25° C.) prepared by diluting a treating liquid (manufactured by The Japan Cee-Bee Chemical Co., Ltd., tradename "Cee-Bee B-21dL") diluted with deionized water, the aluminum plate having the degreasing treatment applied thereto was dipped for 3 minutes to conduct acid etching treatment to the surface of the aluminum plate. The etching amount was 3.5 g/m². Then, washing of the aluminum plate for one minute with deionized water of 25° C. was conducted twice.

Then, in a treatment bath (concentration: 50 g/L, temperature: 45° C.) prepared by diluting a chemical conversion treatment agent (manufactured by The Japan Cee-Bee Chemical Co., Ltd., tradename: Chemibonder 5507) diluted with deionized water, an aluminum plate having the acid etching treatment applied thereto was dipped for two minutes to apply zirconium-type chemical conversion treatment to the aluminum plate to form a chemical conversion treatment coating film on the aluminum plate. Then, washing of the aluminum plate for one minute with deionized water of 25° C. was conducted twice. The aluminum plate was dried in an oven at 70° C. for 5 minutes to prepare an aluminum plate with a chemical conversion treatment coating film.

Ex. 1

Production of Coated Article (Aluminum Plate With Coating Film)

Using an electrostatic coating machine (manufactured by Onoda Cement Co., Ltd., GX3600C), powder coating material A1 was applied by electrostatic coating (applied voltage: −30 kV) to one surface of the chemical conversion treatment coating film of the aluminum plate with a chemical conversion treatment coating film to form a first coating layer composed of the powder coating material A1. Then, powder coating material B1 was applied by electrostatic coating (applied voltage: −60 kV) to the surface of the first coating layer to form a second coating layer composed of the powder coating material B1 thereby to obtain an aluminum plate having two different powder coating layers.

Then, the aluminum plate was kept at 200° C. for 20 minutes and cooled to 25° C. to obtain an aluminum plate with a coating film (corresponding to the coated article) having a first coating film (polyester coating film) having a film thickness of from 55 to 65 μm and a second coating film (fluorinated coating film) having a film thickness of from 55 to 65 μm. The obtained aluminum plate with a coating film as a test specimen was subjected to various evaluations. The results are shown in Table 3.

Ex. 2 to 15

An aluminum plate with a coating film was produced in accordance with the same procedure as in Ex. 1 except that the types of the powder coating materials and the applied voltages were changed as identified in Tables 3 to 5, and subjected to various evaluations. The results are shown in Tables 3 to 5.

Ex. 16

Using an electrostatic coating machine, on one surface of the chemical conversion treatment coating film of the above-prepared aluminum plate with a chemical conversion treatment coating film, powder coating material B6 was applied by electrostatic coating (applied voltage: −60 kV) to obtain an aluminum plate having a coating layer composed of the powder coating material B6.

Then, the aluminum plate was kept at 200° C. for 20 minutes and cooled to 25° C. to obtain an aluminum plate having a coating film containing a polyester resin and a fluorinated polymer, having a film thickness of from 55 to 65 μm. The obtained aluminum plate with a coating film as a test specimen was subjected to various evaluations. The results are shown in Table 5.

<Evaluation Methods>
(1. Observation of Coating Film Cross Section)

The aluminum plate with a coating film was cut, and the cross section of the coating film was observed by a scanning electron microscope and evaluated based on the following standards.

○: An interface between the layer of the fluorinated coating film and the layer of the polyester coating film is clearly formed.

Δ: An interface between the layer of the fluorinated coating film and the layer of the polyester coating film is partly formed, however, partly the layer of the fluorinated coating film and the layer of the polyester coating film are mixed and no interface is formed.

×: An interface between the layer of the fluorinated coating film and the layer of the polyester coating film is not formed at all.

Measurement conditions are as follows.

Testing machine: "JSM-5900LV" manufactured by JEOL Ltd. accelerating voltage: 20 kV, magnification: 10,000

Treatment before measurement: platinum coating at 20mV for 45 seconds by Auto Fine Coater "JFC-1300" manufactured by JEOL Ltd.

(2. Alkali Resistance)

On the coating film of the aluminum plate with a coating film, 10 drops of a 10 mass % aqueous sodium hydroxide solution were put, covered with watch glass and left at rest for one week. Then, the coating film was washed with deionized water and dried, and the state of the coating film was visually observed and evaluated based on the following standards.

○: No swelling, discoloration or disappearance of the coating film, etc. confirmed.

Δ: Swelling, discoloration or disappearance of the coating film, etc. partly confirmed.

×: Swelling, discoloration or disappearance of the coating film, etc. confirmed on the entire film.

(3. Processability)

Processability was evaluated using the aluminum plate with a coating film, in accordance with JIS K5600-5-1 (Bend test, cylindrical mandrel).

Specifically, processability was evaluated using a cylindrical mandrel bend test apparatus (manufactured by Allgood) and a 2 mm mandrel, and evaluation was made based on the following standards.

○: No cracking of the coating film nor peeling of the coating film observed.

Δ: Cracking of the coating film slightly confirmed on the edge portion of the aluminum plate with a coating film.

×: Cracking of the coating film or peeling of the coating film confirmed on the entire surface of the processed part of the coating film.

(4. Impact Resistance (Falling-Weight Resistance))

Impact resistance (falling-weight resistance) was evaluated using the aluminum plate with a coating film in accordance with JIS K5600-5-3 (DuPont method). The test was conducted using a 500 g weight with a falling height of 70 cm, and evaluation was made based on the following standards.

○: No cracking of the coating film nor peeling of the coating film observed.

Δ: Cracking of the coating film slightly confirmed on the edge portion of the aluminum plate with a coating film.

×: Cracking of the coating film or peeling of the coating film confirmed on the entire surface of the coating film.

(5. Surface Smoothness of Coating Film)

Surface smoothness of the coating film of the aluminum plate with a coating film was evaluated using a standard plate for visual evaluation of smoothness by PCI (powder coating institute).

There are ten standard plates 1 to 10, and a larger number indicates more excellent smoothness.

(6. Weather Resistance 1)

The aluminum plate with a coating film was installed outdoor in Naha-city, Okinawa prefecture, and the glossiness of the surface of the coating film immediately before the installation and the glossiness after three years, were measured by using PG-1M (gloss meter, manufactured by Nippon Denshoku Industries Co., Ltd.).

When the value of the glossiness immediately before the installation was taken as 100%, the proportion of the value of the glossiness after three years was calculated as the gloss retention (unit: %), and the weather resistance was evaluated based on the following standards. That is, the weather resistance was measured and calculated in accordance with JIS K5600-1-7.

$$GR\ (\%) = (G1/G0) \times 100$$

GR: gloss retention, G1: specular glossiness of the surface of the coating film after the test, G0: the specular glossiness of the surface of the coating film before the test ○: Gloss retention was at least 80%, and no discoloration of the coating film was observed.

Δ: The gloss retention was at least 60% and less than 80%, and no discoloration of the coating film was observed.

×: The gloss retention was less than 60%, or discoloration of the coating film was observed.

(7. Weather Resistance 2)

Using a xenon weather meter (manufactured by Suga Test Instruments Co., Ltd.), the time until the fluorinated coating film was peeled was measured. Usually water is sprayed, but in this test, instead of spraying water, a 1% hydrogen peroxide aqueous solution was employed.

<Test Conditions>

Relative humidity: 70% RH, temperature: 50° C., light source: 80 W/m$^2$ (wavelength: 300 to 400 nm).

<Evaluation Standards>

○: Peeling occurred for the first time after more than 100 hours.

Δ: Peeling occurred for the first time after more than 60 hours and within 100 hours.

×: Peeling occurred for the first time within 60 hours.

TABLE 3

| | | Ex. 1 | Ex. 2 | Ex. 3 | Ex. 4 | Ex. 5 | Ex. 6 |
|---|---|---|---|---|---|---|---|
| Type of polyester powder coating material/type of fluorinated powder coating material | | A1/B1 | A2/B1 | A3/B1 | A4/B1 | A5/B1 | A6/B1 |
| Applied voltage (V1) for polyester powder coating material (kV) | | −30 | −40 | −50 | −60 | −60 | −60 |
| Applied voltage (V2) for fluorinated powder coating material (kV) | | −60 | −60 | −60 | −60 | −60 | −60 |
| Results | Observation of coating film cross section | ○ | ○ | ○ | ○ | ○ | Δ |
| | Alkali resistance | ○ | ○ | ○ | ○ | ○ | Δ |

TABLE 3-continued

|  | Ex. 1 | Ex. 2 | Ex. 3 | Ex. 4 | Ex. 5 | Ex. 6 |
|---|---|---|---|---|---|---|
| Processability | ○ | ○ | ○ | ○ | ○ | Δ |
| Impact resistance | ○ | ○ | ○ | ○ | ○ | Δ |
| Surface smoothness of coating film | 7 | 7 | 7 | 7 | 7 | 5 |
| Weather resistance 1 | ○ | ○ | ○ | ○ | ○ | Δ |
| Weather resistance 2 | ○ | ○ | ○ | ○ | ○ | ○ |

TABLE 4

|  |  | Ex. 7 | Ex. 8 | Ex. 9 | Ex. 10 | Ex. 11 |
|---|---|---|---|---|---|---|
| Type of polyester powder coating material/type of fluorinated powder coating material | | A7/B1 | A8/B1 | A9/B1 | A10/B1 | A1/B2 |
| Applied voltage (V1) for polyester powder coating material (kV) | | −30 | −40 | −50 | −60 | −30 |
| Applied voltage (V2) for fluorinated powder coating material (kV) | | −60 | −60 | −60 | −60 | −70 |
| Results | Observation of coating film cross section | ○ | ○ | ○ | ○ | ○ |
|  | Alkali resistance | ○ | ○ | ○ | ○ | ○ |
|  | Processability | ○ | ○ | ○ | ○ | ○ |
|  | Impact resistance | ○ | ○ | ○ | ○ | ○ |
|  | Surface smoothness of coating film | 7 | 7 | 7 | 7 | 7 |
|  | Weather resistance 1 | ○ | ○ | ○ | ○ | ○ |
|  | Weather resistance 2 | ○ | ○ | ○ | ○ | ○ |

TABLE 5

|  |  | Ex. 12 | Ex. 13 | Ex. 14 | Ex. 15 | Ex. 16 |
|---|---|---|---|---|---|---|
| Type of polyester powder coating material/type of fluorinated powder coating material | | A1/B3 | A1/B4 | A1/B4 | A11/B5 | B6 |
| Applied voltage (V1) for polyester powder coating material (kV) | | −30 | −30 | −30 | −30 | — |
| Applied voltage (V2) for fluorinated powder coating material (kV) | | −60 | −60 | −85 | −60 | −60 |
| Results | Observation of coating film cross section | ○ | ○ | Δ | Δ | Δ |
|  | Alkali resistance | Δ | ○ | ○ | Δ | x |
|  | Processability | Δ | ○ | ○ | ○ | Δ |
|  | Impact resistance | Δ | ○ | Δ | ○ | Δ |
|  | Surface smoothness of coating film | 4 | 7 | 5 | 7 | 7 |
|  | Weather resistance 1 | Δ | Δ | Δ | x | x |
|  | Weather resistance 2 | ○ | Δ | Δ | Δ | x |

As shown in Tables 3 to 5, according to the production process of the present invention, a coated article having a coating film excellent in weather resistance could be produced. This is apparent also from comparison with Ex. 15 (coating film produced by one coat one bake method) in which a coating film was formed by applying the polyester resin, the fluorinated polymer and the titanium oxide pigment all at once by electrostatic coating. Further, it was confirmed that in the obtained coating film, the polyester coating film and the fluorinated powder coating film were separated.

It was further confirmed from comparison between Ex. 6 and Ex. 1 to 5 that the coating film has more excellent weather resistance when the melt viscosity of the polyester resin at 190° C. is at least 0.6 Pa·s.

This application is a continuation of PCT Application No. PCT/JP2017/026981, filed on Jul. 26, 2017, which is based upon and claims the benefit of priority from Japanese Patent Application No. 2016-146449 filed on Jul. 26, 2016. The contents of those applications are incorporated herein by reference in their entireties.

What is claimed is:

1. A process for producing a coated article having a substrate, comprising:
    applying a curable powder coating material containing a curable polymer containing no fluorine atom, a curing agent and a pigment to a surface of a substrate, to form a first coating layer composed of the curable powder coating material, then
    applying a fluorinated powder coating material containing a fluorinated polymer and containing no pigment to a surface of the first coating layer, to form a second coating layer composed of the fluorinated powder coating material, and
    heating the first coating layer and the second coating layer simultaneously to form a coating film on the surface of the substrate, wherein the melt viscosity of the curable polymer containing no fluorine atom at 190° C. is at least 0.6 Pa·s.

2. The process for producing a coated article according to claim 1, wherein the fluorinated powder coating material further contains at least one organic ultraviolet absorber selected from the group consisting of a salicylic acid ester type, a benzotriazole type, a hydroxyphenyltriazine type, a benzophenone type and a cyanoacrylate type, or an inorganic ultraviolet absorber.

3. The process for producing a coated article according to claim 1, wherein the fluorinated powder coating material further contains at least one resin selected from the group consisting of a (meth)acrylic resin, a polyester resin and an epoxy resin.

4. The process for producing a coated article according to claim 1, wherein the fluorinated polymer is a curable fluorinated polymer, and the fluorinated powder coating material further contains a curing agent.

5. The process for producing a coated article according to claim 4, wherein the curable fluorinated polymer is a curable fluorinated polymer having at least one type of functional group selected from the group consisting of a hydroxy group and a carboxy group, and the curing agent contained in the fluorinated powder coating material has at least two groups per molecule of at least one type reactive with the functional group, selected from the group consisting of an isocyanate group, a blocked isocyanate group, an alkoxysilyl group, a carbodiimide group, an oxazoline group, an epoxy group, an alkylated methylol group, a hydrazide group and a β-hydroxyalkylamide group.

6. The process for producing a coated article according to claim 1, wherein the fluorinated polymer is PVDF.

7. The process for producing a coated article according to claim 1, wherein the curable polymer containing no fluorine atom is at least one non-fluorinated resin selected from the group consisting of a polyester resin, a (meth)acrylic resin and an epoxy resin.

8. The process for producing a coated article according to claim 1, wherein the melt viscosity of the curable polymer containing no fluorine atom at 190° C. is from 0.6 to 10 Pa·s.

9. The process for producing a coated article according to claim 1, wherein the melt viscosity of the fluorinated polymer at 190° C. is higher than the melt viscosity of the curable polymer containing no fluorine atom at 190° C. and is at most 10 Pa·s.

10. The process for producing a coated article according to claim 1, wherein the absolute value of the difference between the angle of repose of the curable powder coating material and the angle of repose of the fluorinated powder coating material is within 20°.

11. The process for producing a coated article according to claim 1, wherein the first coating layer and the second coating layer are heated simultaneously to a temperature of at most 200° C.

12. The process for producing a coated article according to claim 1, wherein
the first coating layer composed of the curable powder coating material is formed by applying the curable powder coating material to the surface of the substrate by electrostatic coating,
the second coating layer composed of the fluorinated powder coating material is formed by applying the fluorinated powder coating material to the surface of the first coating layer by electrostatic coating, and
the applied voltage (V2) at the time of electrostatic coating of the fluorinated powder coating material to the applied voltage (V1) at the time of electrostatic coating of the curable powder coating material is within a range of the applied voltage (V1)±100 kV.

13. The process for producing a coated article according to claim 1, wherein the substrate is a substrate formed from aluminum or an aluminum alloy surface-treated with a chemical conversion treatment agent.

14. The process for producing a coated article according to claim 13, wherein the chemical conversion treatment agent is a zirconium-type chemical conversion treatment agent or a titanium-type chemical conversion treatment agent.

15. The process for producing a coated article according to claim 1, wherein the coated article is a building exterior member.

16. The process for producing a coated article according to claim 1, wherein the curable polymer containing no fluorine atom is a polyester resin having a weight average molecular weight (Mw) of from 2,000 to 20,000.

17. The process for producing a coated article according to claim 1, wherein a content of the pigment in the curable powder coating material is from 20 to 200 parts by mass per 100 parts by mass of the curable polymer containing no fluorine atom.

* * * * *